United States Patent
Gajewska et al.

(10) Patent No.: US 7,073,136 B2
(45) Date of Patent: Jul. 4, 2006

(54) METHOD FOR KEYSTROKE DELIVERY TO DESCENDANTS OF INACTIVE WINDOWS

(75) Inventors: Hania Gajewska, Woodside, CA (US); David P. Mendenhall, New York, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 874 days.

(21) Appl. No.: 09/887,402

(22) Filed: Jun. 22, 2001

(65) Prior Publication Data

US 2002/0175952 A1 Nov. 28, 2002

Related U.S. Application Data

(60) Provisional application No. 60/292,688, filed on May 22, 2001.

(51) Int. Cl.
 *G06F 3/00* (2006.01)
 *G06F 9/00* (2006.01)
 *G06F 17/00* (2006.01)

(52) U.S. Cl. .................. 715/802; 715/808; 715/806; 715/807; 715/764; 715/744; 709/218; 719/328

(58) Field of Classification Search .............. 345/744, 345/762, 755, 764, 802; 709/218; 719/328; 715/807, 808, 806

See application file for complete search history.

(56) References Cited

U.S. PATENT DOCUMENTS

| 5,544,299 | A |   | 8/1996  | Wenstrand et al. ......... 395/155 |
|-----------|---|---|---------|-----------------------------------|
| 5,557,725 | A | * | 9/1996  | Ansberry et al. ........... 345/755 |
| 5,790,117 | A | * | 8/1998  | Halviatti et al. ............ 345/744 |
| 5,922,054 | A | * | 7/1999  | Bibayan ..................... 719/328 |
| 6,205,474 | B1 | * | 3/2001 | Hurley ....................... 709/218 |
| 6,212,541 | B1 |   | 4/2001 | McAuliffe et al. .......... 709/100 |
| 6,249,284 | B1 | * | 6/2001 | Bogdan ...................... 345/764 |
| 6,469,714 | B1 | * | 10/2002 | Buxton et al. ............. 345/762 |

OTHER PUBLICATIONS

Mark McCulley, "Focus on Swing, Explore Focus Management with JFC's Swing Components" Java World, Jul. 1998, XP-002194913, 5 Pages.

PCT International Search Report dated Dec. 17, 2002, 3 pages.

* cited by examiner

*Primary Examiner*—Kristine Kincaid
*Assistant Examiner*—Boris Pesin
(74) *Attorney, Agent, or Firm*—Osha Liang LLP

(57) ABSTRACT

A method for delivering keystrokes to descendants of an inactive window includes remembering a descendant of the inactive window as the next focus owner when the descendant receives a focus-in event, creating a focus proxy for the inactive window and issuing a request to set focus to the focus proxy, marking the next focus owner as the true focus owner when the focus proxy receives a focus-in event, and directing the focus-in event received by the focus proxy to the true focus owner.

37 Claims, 16 Drawing Sheets

FIGURE 4 (PRIOR ART)

METHOD FOR KEYSTROKE DELIVERY TO DESCENDANTS OF INACTIVE WINDOWS

CROSS-REFERENCE TO RELATED APPLICATIONS

This application claims priority from U.S. provisional application Ser. No. 60/292,688, filed May 22, 2001.

BACKGROUND OF INVENTION

1. Field of the Invention

The invention relates generally to windowing toolkits for computers.

2. Background Art

The basic functionality of a computer is dictated both by the hardware of the computer and by the type of operating system it uses. Various operating systems exist in the marketplace, including Solaris from Sun Microsystems, Inc., MacOS from Apple Computer, Inc., the "Windows" operating systems, e.g., Windows® 95/98 and Windows NT®, from Microsoft Corporation, and Linux. A given combination of computer hardware, an operating system, and a windowing system will be referred to herein as a "platform." Prior to the popularity of the Internet, software developers wrote programs specifically designed to run on specific platforms. Thus, a program written for one platform could not be run on another. However, the advent of the Internet made cross-platform compatibility a necessity.

Prior art FIG. 1 illustrates a conceptual arrangement wherein a first computer 3 running the Solaris platform and a second computer 5 running the Windows® 98 platform are connected to a server 9 via the Internet 7. A resource provider using the server 9 might be any type of business, governmental, or educational institution. The resource provider has a need to provide its resources to both the user of the Solaris platform and the user of the Windows® 98 platform, but does not have the luxury of being able to custom-design its content for the individual platforms.

The Java™ programming language was developed by Sun Microsystems to address this problem. The Java™ programming language was designed to be simple for the programmer to use, yet to be able to run securely over a network and work on a wide range of platforms.

Prior art FIG. 2 illustrates how to create a Java™ application. In order to create a Java™ application, the developer first writes the application in human-readable Java™ source code. As used herein, the term "application" refers to both true Java™ applications and Java™ "applets," which are essentially small applications usually embedded in a web page. In the example shown, the application "Program" 11 is created as a human-readable text file. The name of this text file is given the required extension "java ".

A Java™ compiler 13, such as "javac" available from Sun Microsystems, Inc., is used to compile the source code into a machine-readable binary file 15. The source text file 11 will contain Java™ language commands, e.g., "import java.awt.Frame". A discussion of the Java™ language itself is beyond the scope of this document. However, complete information regarding the Java™ programming language is available from Sun Microsystems, both in print and via the Internet at java.sun.com. The resulting binary file 15 will automatically receive the same file name as the source text file 11, but will use ".class" as the trailing extension.

The Java™ runtime environment incorporates a Java™ "virtual machine" ("JVM") 16 to convert the ".class" byte codes into actual machine executions 17. The machine executions (like drawing windows, buttons, and user prompt fields) will occur in accordance to the application developer's code instructions. Because Sun Microsystems specifically designed the JVM to run on different platforms, a single set of ".class" byte codes will execute on any platform where a JVM has been installed. An Internet browser such as Netscape Navigator or Microsoft Internet Explorer that incorporates a JVM is called a "Java™-enabled" browser.

The cross-platform architecture of the Java™ programming language is illustrated in prior art FIG. 3, which shows how the Java™ language enables cross-platform applications over the Internet. In the figure, the Solaris platform 3 and the Windows® 98 platform 5 are each provided with a Java™ virtual machine ("JVM") 21. The resource provider creates a Java™ application using the Java™ software development kit ("SDK") 23 and makes the compiled Java™ byte codes available on the server 9. Through standard Internet protocols, both the computer 3 and the computer 5 may obtain a copy of the same byte codes and, despite the difference in platforms, execute the byte codes through their respective JVMs.

Typical computer applications, including most Java™ applications, provide graphical user interfaces (GUIs). A GUI consists of graphical components, such as windows, buttons, and text fields displayed on the screen. The user interacts with an application by means of the GUI, clicking on the buttons or typing text into the text fields.

Platforms, including the Java™ platform, provide the developer convenient means for writing the GUI portions of applications in the form of user interface toolkits.

Such toolkits typically include a set of pre-built graphical components (buttons, text fields, etc.) that the developer uses to build applications. The toolkits may also provide mechanisms for other functions. One such function is keeping track of which component will receive keyboard input typed by the user. Typically, at any given time, keyboard input will be directed to one special component, called the "focused component" or "focus owner". This component may be distinguished in appearance by a highlight or a blinking caret. The user may change which component is the focused component, typically by using the mouse to click on the desired new focus owner. Many user interface toolkits will interpret such mouse clicks and respond by resetting the focus owner to the clicked-on component.

Modem platforms provide facilities for multiple graphical applications to be running at the same time, and each application may present the user with multiple windows. Therefore, a typical display will show many windows simultaneously. One of these windows will usually be distinguished, typically with a darkened title bar, as the "active window". The active window is the window with which the user is currently interacting. It will contain the focused component, if there is one.

Prior art FIG. 4 illustrates an exemplary display on a screen 31 including windows 33, 34, and 35. Each window includes a title bar 37 for displaying the title of the window and, if applicable, a menu bar 39 containing a number of pull down menu buttons defined by the developer. In this example, window 34 is the active window, as indicated by its darkened title bar. Windows 33 and 35 are inactive as indicated by their grayed out title bars. The text field 61 in window 34 is the focus owner, as indicated by the caret (which may be blinking, to further draw the user's attention). The window 33 includes a number of typical components, including "radio buttons" 41 which in this case allow the user to select a prefix, a text field 43 for entering a name, and an address field 45 for entering an address. Component 47 is a "chooser" that allows the user to choose a state. "Check boxes" 49 allow the user to select one or all of the options that apply. Associated with these check boxes are additional radio buttons 51 and 53 that allow the user to select a desired means of transmission. If the "QUOTE" check box 49 is selected and the telephone radio button is selected, the window 34 appears allowing the user to enter telephone numbers. An additional text area 57 is associated with the "OTHER" check box 49. Finally, "SUBMIT" and "RESET" buttons 59 are provided to allow the user to either submit the form or to reset it.

The Java™ platform provides the developer with two user interface toolkits that may be used to build applications: the Abstract Windowing Toolkit, abbreviated AWT, and Swing. The AWT has a unique architecture, in that it is built on top of each platform's native toolkit and uses each platform's native components. For example, an AWT text field consists of the native toolkit's text field component, together with additional data. The underlying native component, called the "heavyweight peer," is used to provide much of the AWT component's functionality. For example, the AWT delegates the job of painting the component on the screen to the native toolkit. In this way, the AWT can be used to build applications that, on each platform, look and behave like the platform's native applications.

Swing, by contrast, contains no heavyweight peers. Instead, its components are "lightweight," that is, have no corresponding native components. In fact, the underlying native toolkit is unaware of Swing's components, so nearly all of the components' functionality must be provided by Swing.

When a user interacts with a computer by typing on the keyboard or clicking the mouse on different areas of the computer screen, the underlying native platform informs the appropriate application of the user's actions by means of native "events." These events are platform-specific and contain different information depending on the action that the user performed. For example, if the user typed a key on the keyboard, the underlying platform might generate a "key pressed" event when the key was pressed and a "key released event" when the key was released. The events will contain various information about the user action, such as which key was pressed and released or the state of the keyboard (e.g., the CAPS-LOCK key) during the user's actions.

As mentioned above, the events are generated by the underlying platform and are therefore platform-specific. Different platforms will generate different events in response to the same user actions, and the events themselves will contain different information depending on the platform that generated them. Another difference between platforms may be the way in which events are delivered to the appropriate application. On some systems, events might be placed on a queue, and it is the application's responsibility to dequeue the events and process them. On other systems, the application may register a special procedure, called an "event handler," with the underlying platform. This event handler will be called whenever the platform wishes to deliver an event to that application.

These platform differences in events and event delivery mechanisms are some of the reasons that, prior to the Java™ platform's introduction, it was impossible for developers to write applications that worked on multiple platforms without customizing the application for each platform. The Java™ user interface toolkits address this problem by providing a uniform event model for all platforms on which the Java™ platform is implemented. The Java™ implementation hides both the native delivery mechanism and the native events themselves from its applications by registering native handlers or dequeuing native events as appropriate. Then, based on the native events it receives, it generates the appropriate "Java™ events" and delivers them to its applications via a mechanism of its own (typically by calling Java™ event handlers registered by the Java™ application.)

Because different platforms generate different native events, it follows that there is not a one-to-one mapping between native events and Java™ events. Also, because native events on different platforms contain different information, in some cases platform-specific information may be omitted from a Java™ event, while in other cases information not present in a native event may need to be computed for inclusion in a Java™ event. It is the job of the Java™ implementation on each platform to unify these differences so that Java™ applications on different platforms receive the same sequence of Java™ events when exposed to the same user actions.

Referring back to prior art FIG. 4, we observe that top-level windows 33, 34, and 35 all have title bars that display each window's title and may be highlighted to indicate that the window is active. Windows that include title bars are referred to as "decorated windows."

In addition to decorated windows, AWT defines a different kind of top-level window called an "undecorated window." An undecorated window does not have a title bar and can never be the active window. An example of such a window is shown in prior art FIG. 5, wherein window 33 is shown as active on the screen. In addition to window 33, in response to some action by the user or programmatically, undecorated window 65 appears on the screen with, for example, a textual reminder such as "remember to connect cable." It should be noted that undecorated window 65 does not have a title bar or other decoration and thus cannot be the active window. Although in this example the undecorated window 65 simply displays informational text to the user, numerous other applications of undecorated windows exist. For example, undecorated windows can be used as tool tips or popup menus.

On most platforms, only a descendant of the active window can be the focus owner, but Java™ undecorated windows can never be active. (Note that a descendant as referred to herein may not be proper—that is, the window itself is considered one of its descendants.) Therefore, native platforms' definitions of focus dictate that no descendant of a Java™ undecorated window could ever be the focus owner. On the other hand, AWT's definition of undecorated windows requires that their descendants be capable of receiving keystrokes. It is the responsibility of the Java™ implementation on each platform to reconcile the platform's definition of focus with the requirements of the Java™ platform.

Therefore, a need exists for a mechanism by which keystrokes can be delivered to windows that cannot be active, such as AWT's undecorated windows, without violating the native platform's definition of focus.

SUMMARY OF INVENTION

In one aspect, the invention relates to a method for delivering keystrokes to descendants of an inactive window which comprises remembering a descendant of the inactive window as the next focus owner when the descendant receives a focus-in event, creating a focus proxy for the inactive window and issuing a request to set focus to the focus proxy, marking the next focus owner as the true focus owner when the focus proxy receives a focus-in event, and directing the focus-in event received by the focus proxy to the true focus owner.

In another aspect, the invention relates to a method for delivering keystrokes to descendants of an inactive window which comprises remembering a descendant of the inactive window as the next focus owner when the descendant receives a focus-in event, creating a focus proxy for the inactive window and issuing a request to set focus to the focus proxy, marking the next focus owner as the true focus owner when the focus proxy receives a focus-in event, directing the focus-in event received by the focus proxy to the true focus owner, and directing a key event received by the focus proxy to the true focus owner.

In another aspect, the invention relates to a method for delivering keystrokes to descendants of an inactive window which comprises creating a focus proxy for the inactive window and directing a key event received by the focus proxy to a descendant of the inactive window.

In another aspect, the invention relates to a computer-readable medium having stored thereon a program which is executable by a processor. The program comprises instructions for creating a focus proxy for the inactive window and directing a key event received by the focus proxy to a descendant of the inactive window.

Other aspects and advantages of the invention will be apparent from the following description and the appended claims.

BRIEF DESCRIPTION OF DRAWINGS

Figure 4:
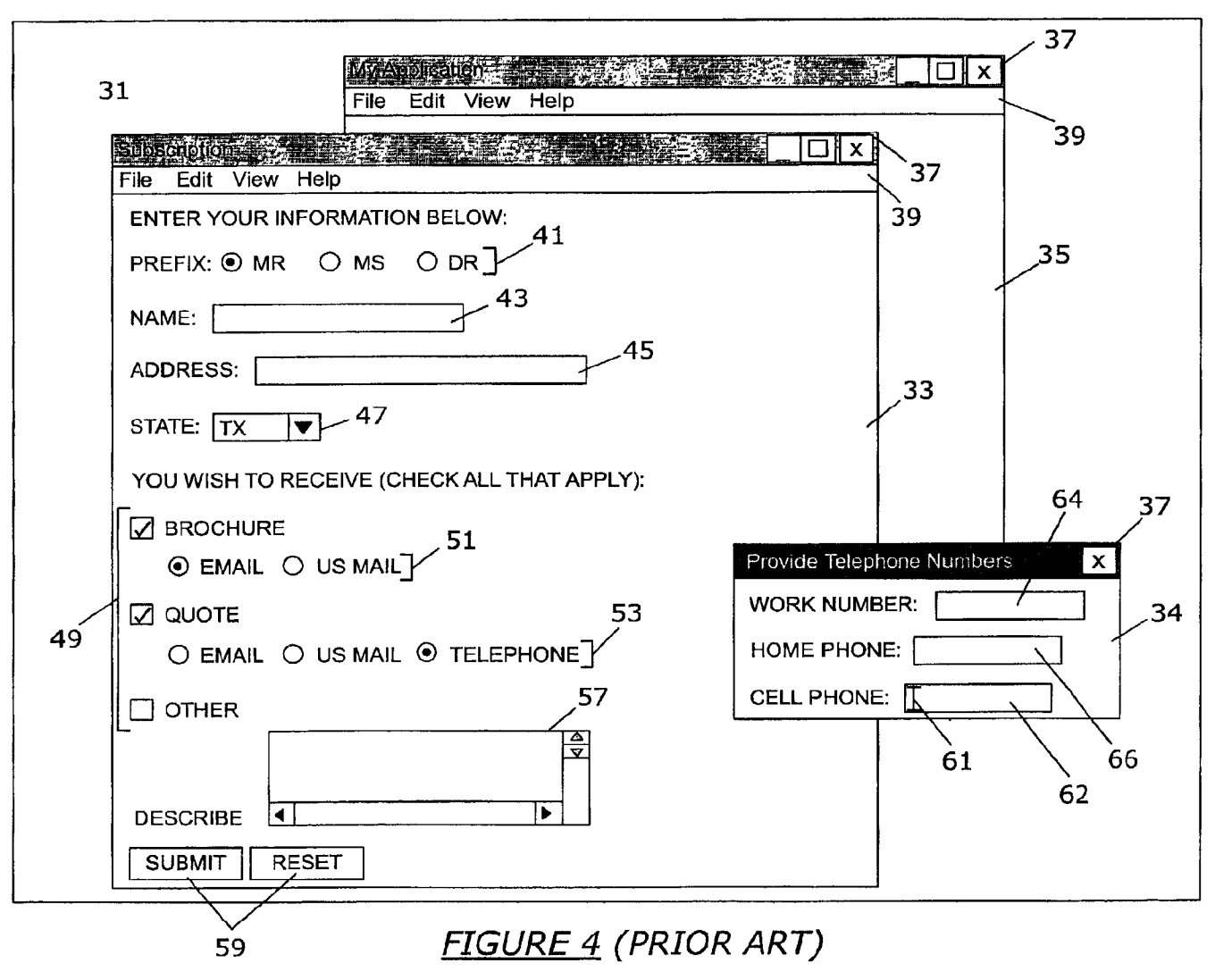

FIG. 4 illustrates a typical graphical user interface (GUI).

DETAILED DESCRIPTION

Figure 1:
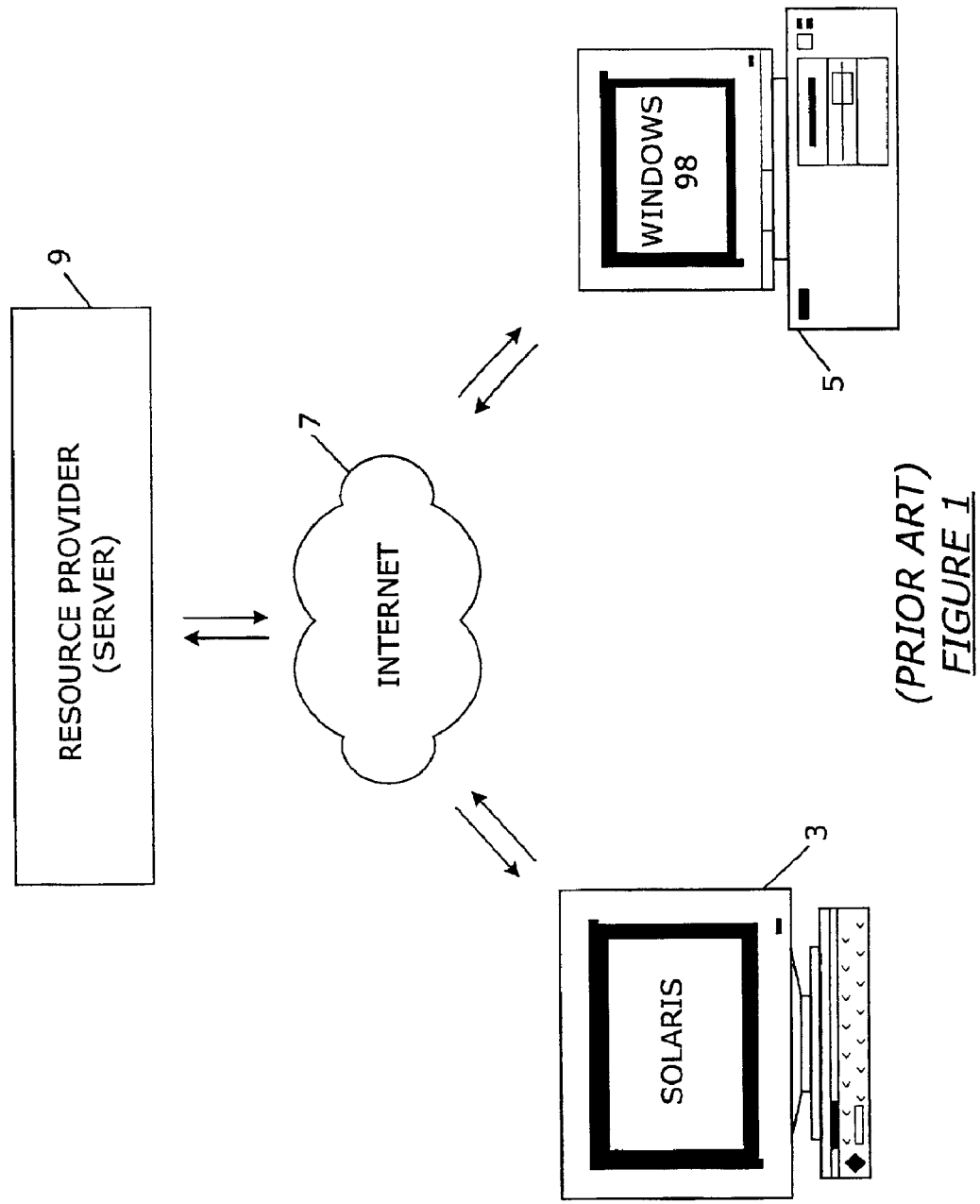
FIG. 1 illustrates a multiple platform environment.
Figure 2:
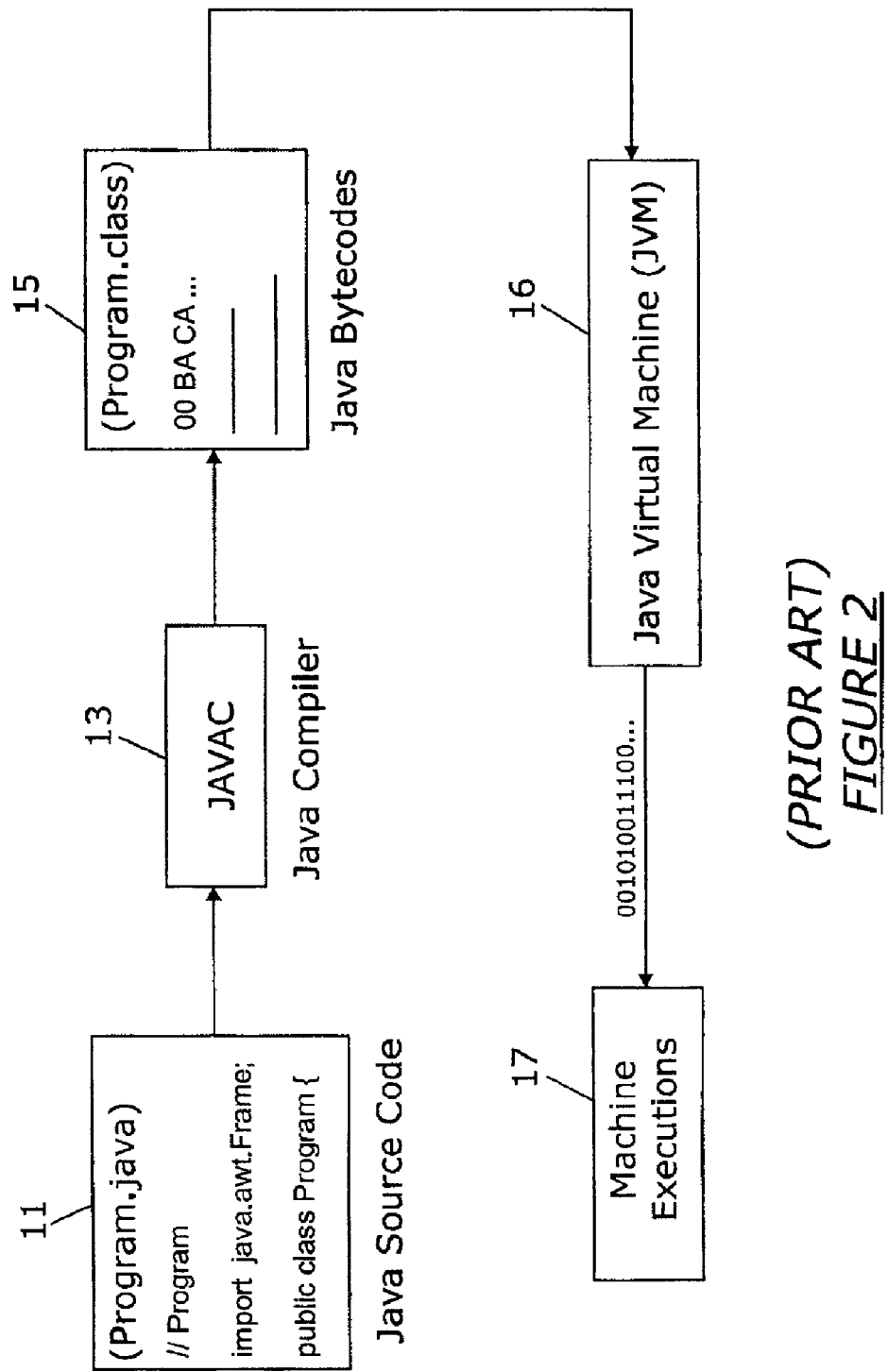
FIG. 2 illustrates a mechanism for creating Java™ applications.
Figure 3:
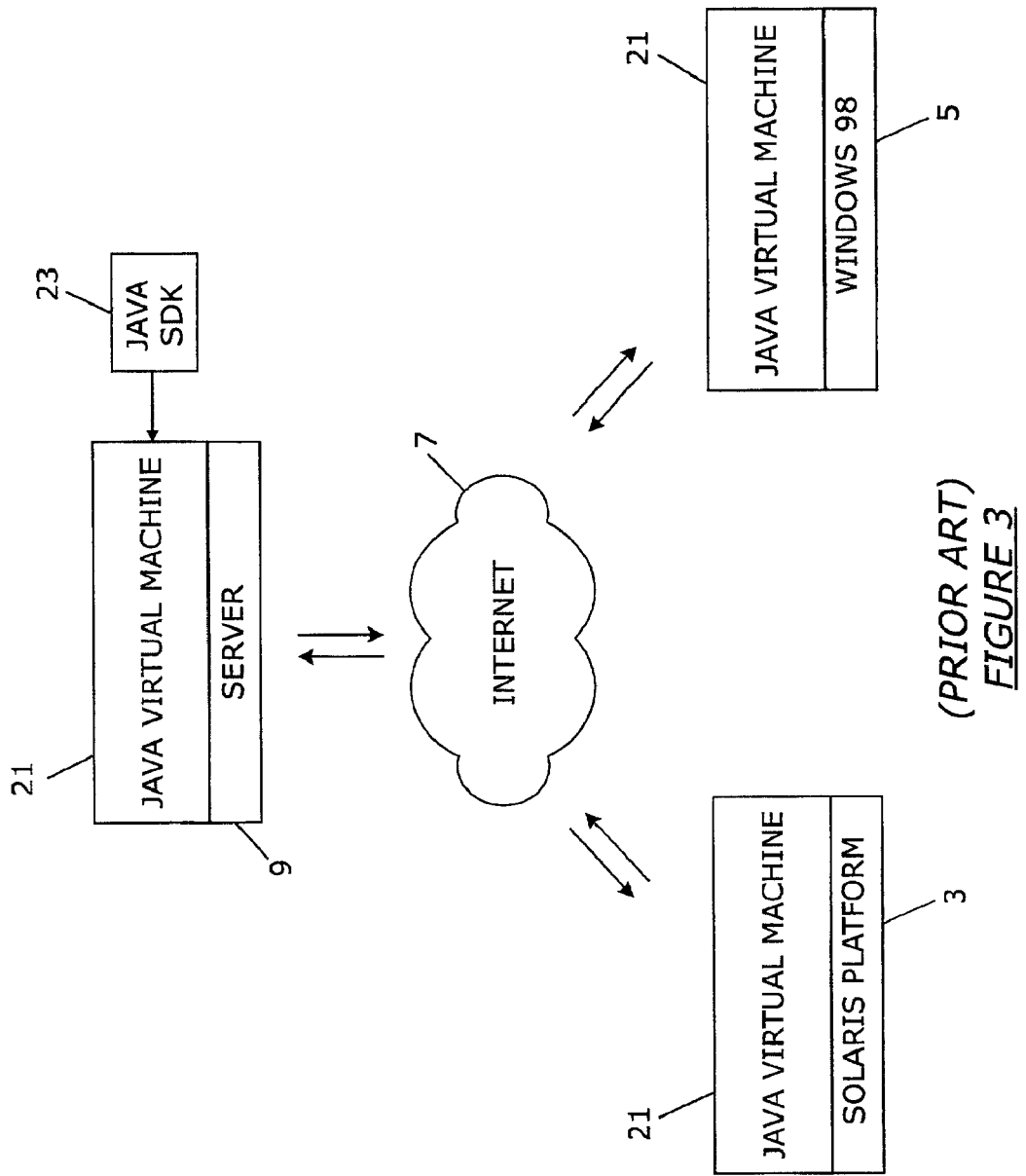
FIG. 3 illustrates a Java™ application running in a multiple platform environment.

Specific embodiments of the invention will now be described in detail with reference to the accompanying figures. Like elements in the various figures are denoted by the same reference numerals for consistency.

Figure 6:
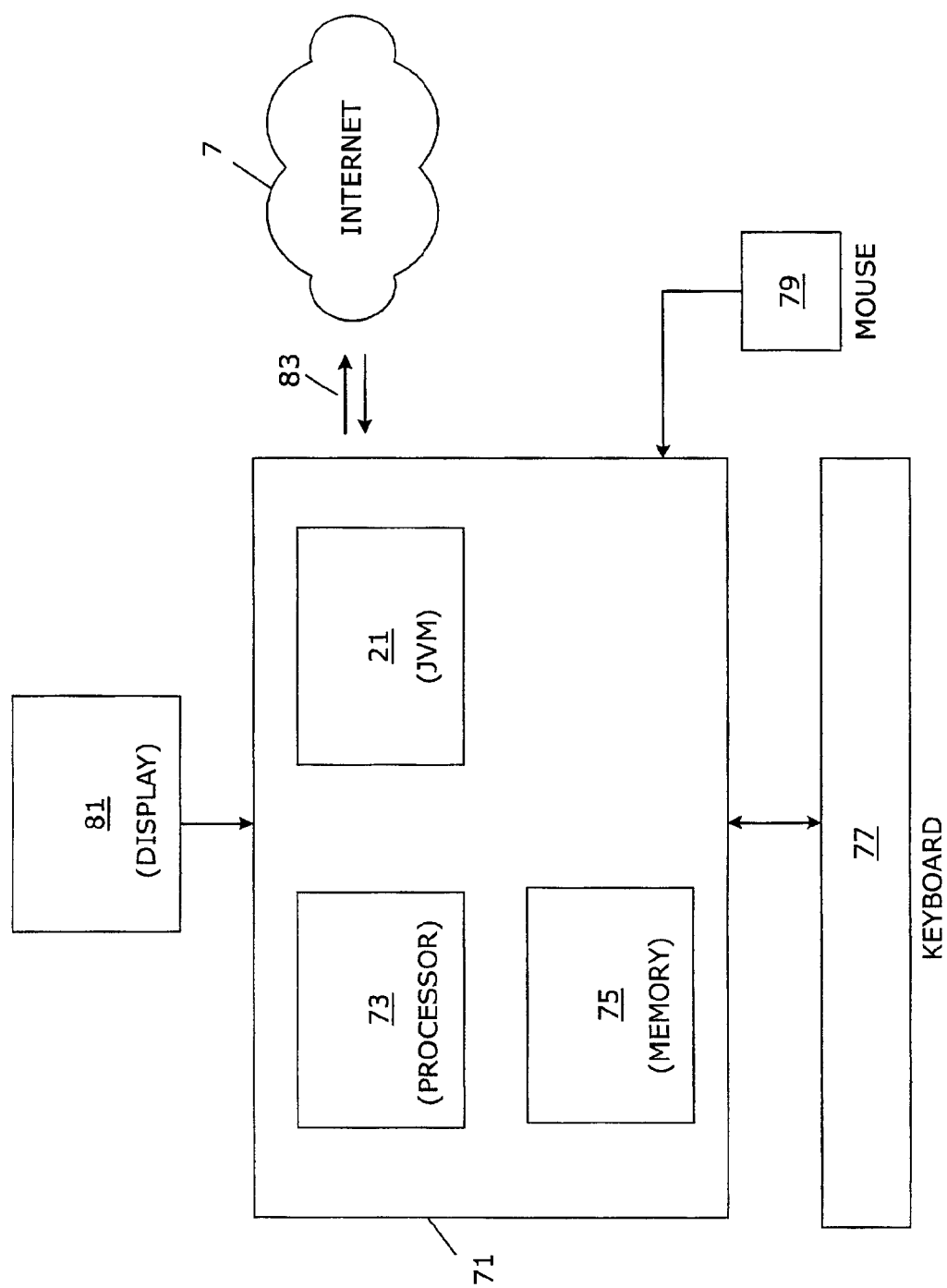
FIG. 6 illustrates a typical computer and its components as they relate to the Java™ virtual machine.

The invention described here may be implemented on virtually any type computer regardless of the platform being used. For example, as shown in FIG. 6, a typical computer 71 will have a processor 73, associated memory 75, and numerous other elements and functionalities typical to today's computers (not shown). The computer 71 will have associated therewith input means such as a keyboard 77 and a mouse 79, although in an accessible environment these input means may take other forms. The computer 71 will also be associated with an output device such as a display 81, which may also take a different form in an accessible environment. Computer 71 is connected via a connection means 83 to the Internet 7. The computer 71 is configured to run a Java™ virtual machine 21, implemented either in hardware or in software.

Figure 5:
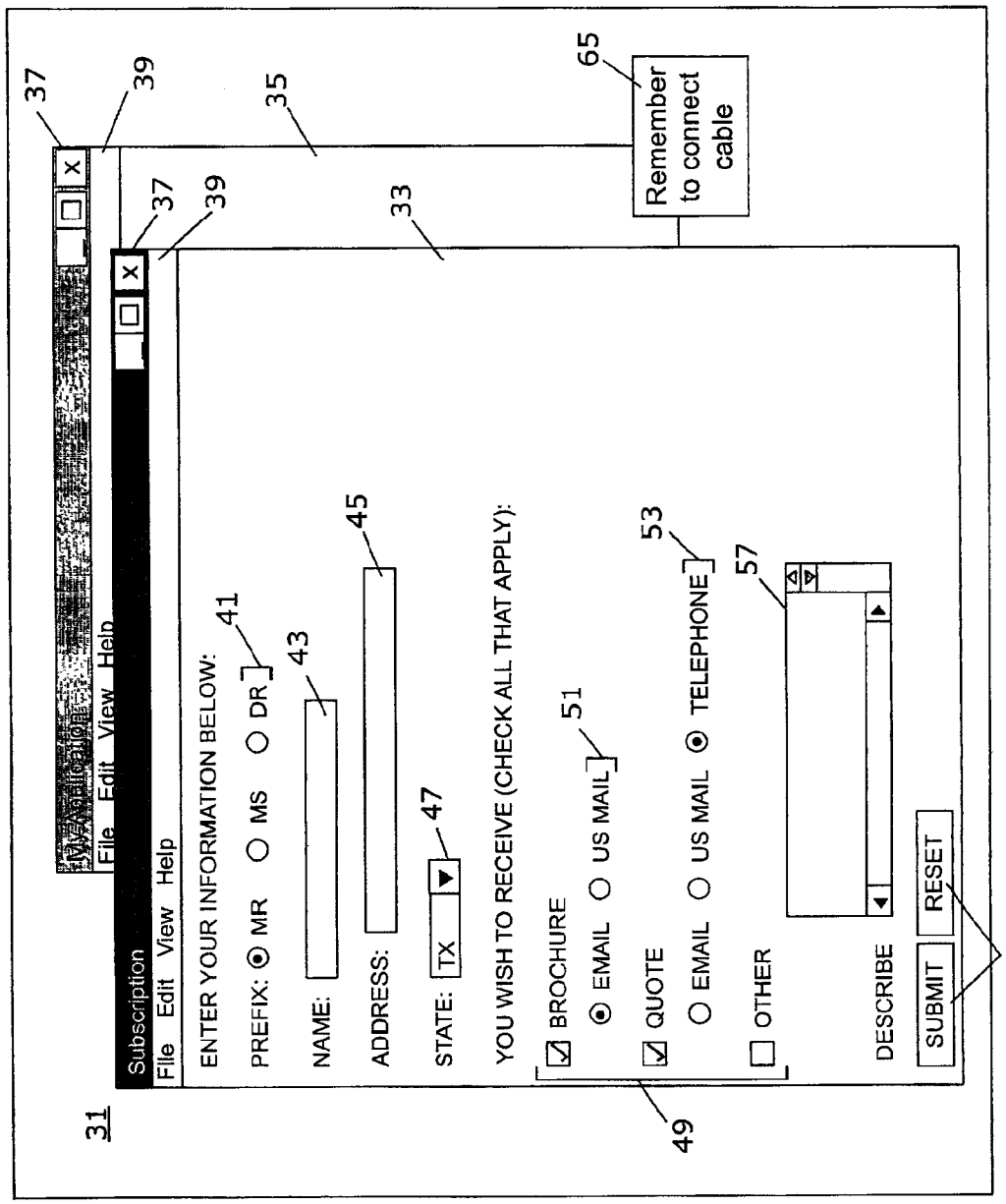
FIG. 5 illustrates a GUI including an undecorated window.

The present invention provides a mechanism for delivering keystrokes to descendants of windows that cannot be active, such as AWT's undecorated windows. The mechanism requires that each such window have an "owner." The owner of the undecorated window may be another undecorated window or a decorated window. A decorated window may or may not have an owner. It follows therefore that every undecorated window will eventually have a decorated window in its ownership hierarchy. Referring to prior art FIG. 5, for example, this is a very simple situation wherein two top-level decorated windows 33 and 35 are shown. Decorated window 33 is the active window, and the owner of undecorated window 65 is decorated window 33. However, there may be (and often will be) multiple decorated and undecorated windows in a particular ownership hierarchy, depending upon the developer's wishes and the desired application.

In accordance with an embodiment of the invention, delivery of keystrokes to an undecorated window is allowed only when the undecorated window's nearest owning decorated window is the active window. In accordance with this implementation, it follows that the following properties must be maintained:

1. As noted previously, the Java™ platform's definition of undecorated windows requires that they never be active. This means that, from the viewpoint of the native platform, no descendant of the undecorated window may ever be the focus owner. If this were not the case, the decorated window that owns the undecorated window would cease being the active window, e.g., lose its darkened title bar. Thus, the implementation may never allow native-level focus to remain permanently in any descendant of the undecorated window, although focus may be temporarily assigned there. (Recall that the descendant need not be proper, and thus this restriction includes the undecorated window itself.)

2. Notwithstanding the above, because the AWT requires that undecorated windows be able to accept keystrokes, descendants of the undecorated window must be able to make Java™-level focus requests. The Java™ platform defines undecorated windows as being capable of having various types of descendants, e.g., text fields, into which the user may want to type.

3. A descendant of the undecorated window must receive native-level "focus-in" and "focus-out" events in response to a focus request. The reason for this is that the descendant may, in some applications, be a heavyweight component implemented via AWT's heavyweight-peer mechanism. In accordance with this mechanism, the components within a Java™ application are created and maintained by the native platform and are unaware of their Java™ environment. In order for such native components to function properly, it is necessary to send native-level focus events to them. For example, a native text field component should blink a caret when the component expects a user to type at it. However, it will not begin to blink a caret until it receives a native focus-in event.

4. Java™-level focus requests made by a descendant of an undecorated window will result in keystrokes being delivered to that descendant only if its nearest owning decorated window is the active window.

5. Descendants of the undecorated window must receive native-level keystrokes. This, again, is so that heavyweight components can respond properly to a user's typed input by, for example, displaying the typed characters on the screen.

In order to achieve these properties simultaneously, it is clear that a focus request from a descendant of an undecorated window must never simply be translated into a native-level focus request out of the owning decorated window. However, the component requesting focus must receive a native-level focus event in order to function properly. In accordance with one embodiment of the invention, this dichotomy is resolved by creating a special "invisible child" window of the nearest owing decorated window. This invisible child window will be referred to herein as the "focus proxy" of the undecorated window. We will say that the undecorated window for which the focus proxy is created and its descendants are "governed" by the focus proxy.

In operation, therefore, when a descendant of an undecorated window requests focus, the requestor is remembered as the "next focus owner". The request is then translated into a native focus request on the focus proxy. When the native focus-in event is received in response to the native focus request on the focus proxy, the system will look up the "next focus owner" (which had been remembered previously), and mark it as the "true focus owner." Then, the system will retarget the native focus-in event and forward it to the "true focus owner." Thus, from the point of view of the native platform, the focus proxy is now the focus owner. However, the focus requester, or "true focus owner," is fooled into thinking that it owns native focus. Meanwhile, in the Java™ system, the "true focus owner" has been recorded.

Once the above has occurred, native key events, i.e., keystrokes entered by the user, will be targeted by the native platform to the focus proxy, which is the native focus owner. However, when the Java™ system sees such a key event directed to the focus proxy, it will retarget the event and forward it to the "true focus owner." In this way, native key events will be delivered to the descendant of the undecorated window as required.

When a native focus-out event is received on the focus proxy, the Java™ system will retarget and forward the event to the "true focus owner." The Java™ system will then remember, from that point on, that the component is no longer the focused component, i.e. is not the "true focus owner". At the same time, the component can react to the native focus-out event in an appropriate manner, e.g., by disabling a blinking caret.

The above process is further explained with reference to FIGS. 7A–12E. Starting with FIG. 7A, a user may initially issue a focus request by clicking on a descendant of an undecorated window (UW) (ST156). Alternatively, the UW descendant may itself issue a focus request programmatically (ST158), i.e., through a function invocation. Upon receiving the focus request, the native platform generates a native activation event targeted to UW. (Recall that many platforms do not distinguish between decorated and undecorated windows and do not know that an undecorated window should not be active.)

Figure 9:
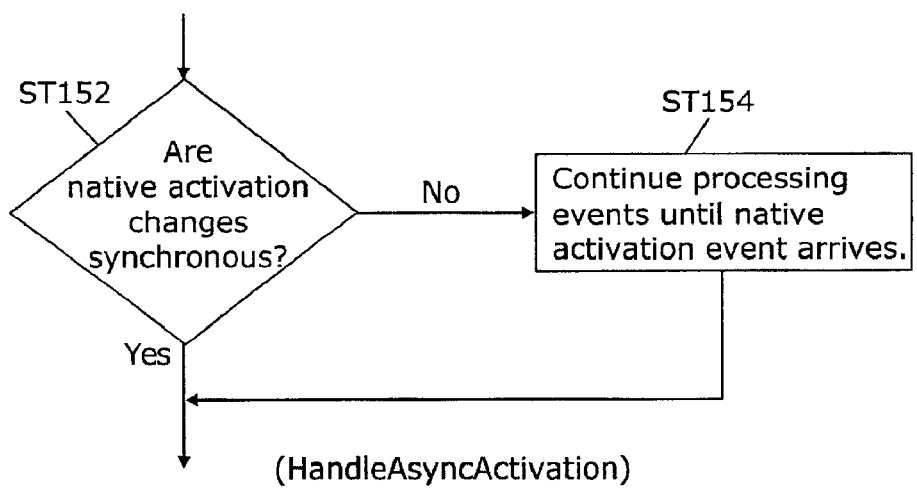
FIG. 9 is a flowchart of a macro for handling activation changes on a potentially asynchronous native platform.

The action represented by the macro HandleAsyncActivation is now executed before UW receives the native activation event. FIG. 9 shows a flow chart of the HandleAsyncActivation action. The macro HandleAsyncActivation should be replaced with this flowchart whenever it appears in any of the other figures. The HandleAsyncActivation action involves checking whether native activation changes are synchronous or asynchronous (ST152). Depending upon the native platform, a focus request made via a function invocation may execute synchronously or asynchronously. If the function executes synchronously, then all the effects of the function invocation will be rendered before the function returns. If the function executes asynchronously, then some of the effects of the invocation may not have been rendered before the call returns, however, in this case, they will be rendered at some unknown point in the future, at which time the application will be notified via an event. Thus, if the activation changes are synchronous, the next event processed will be an activation event. If the function executes asynchronously, processing of other events will continue until the next activation event arrives (ST154).

Returning to FIG. 7A, when UW receives the native activation event, the event is discarded (ST160) in order to maintain the invariant that the UW cannot be active. The native activation event can be discarded, for example, by preventing any further processing of the event.

Figure 8:
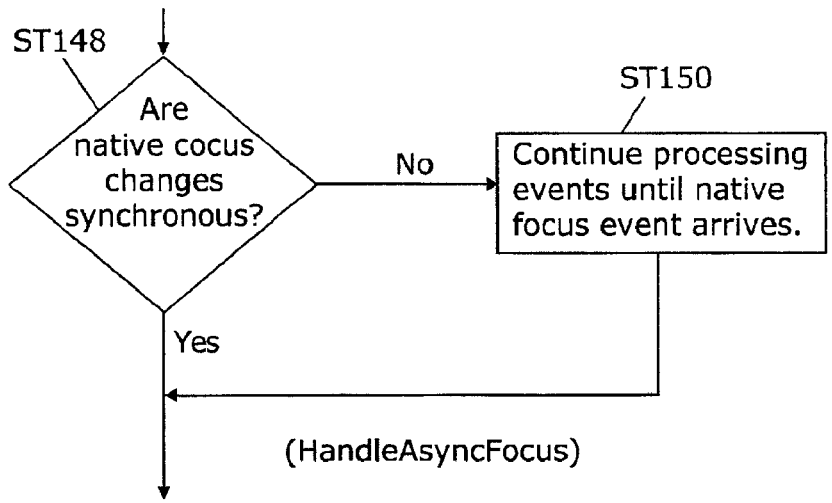
FIG. 8 is a flowchart of a macro for handling focus changes on a potentially asynchronous native platform.

Following the activation event, the native platform generates a native focus-in event targeted at the UW descendant. Before UW receives the native focus-in event, an action represented by the macro HandleAsyncFocus is executed. This HandleAsyncFocus action is similar to the HandleAsyncActivation action, except that it is directed to focus changes. FIG. 8 shows a flowchart of the HandleAsyncFocus action. The macro HandleAsyncFocus should be replaced by this flowchart whenever it appears in other figures. As in the HandleAsyncActivation case, the HandleAsyncFocus action involves checking whether native focus changes are synchronous or asynchronous (ST148). If the focus changes are synchronous, the next event processed will be a focus event. If the focus changes are asynchronous, processing of other events will continue until the next focus event arrives (ST150).

When the UW descendant receives the native focus-in event, the UW descendant is remembered as the "next focus owner" and the native focus-in event is discarded (ST162). After discarding the native focus-in event, a focus proxy is created on the nearest owning decorated window (DW) if one has not already been created (ST164). Then a native focus request is issued for the focus proxy. This will cause the native platform to generate a focus-out event targeted at the UW descendent that originally requested focus, and a deactivation event for UW. After step ST164, the HandleAsyncFocus action (shown in FIG. 8) is executed until the focus-out event is received. When the UW descendant receives a native focus-out event (ST166), the event is discarded. Then, the HandleAsyncActivation action (shown in FIG. 9) is executed until UW receives the native deactivation event, and that event is similarly discarded (ST168).

Figure 7A:
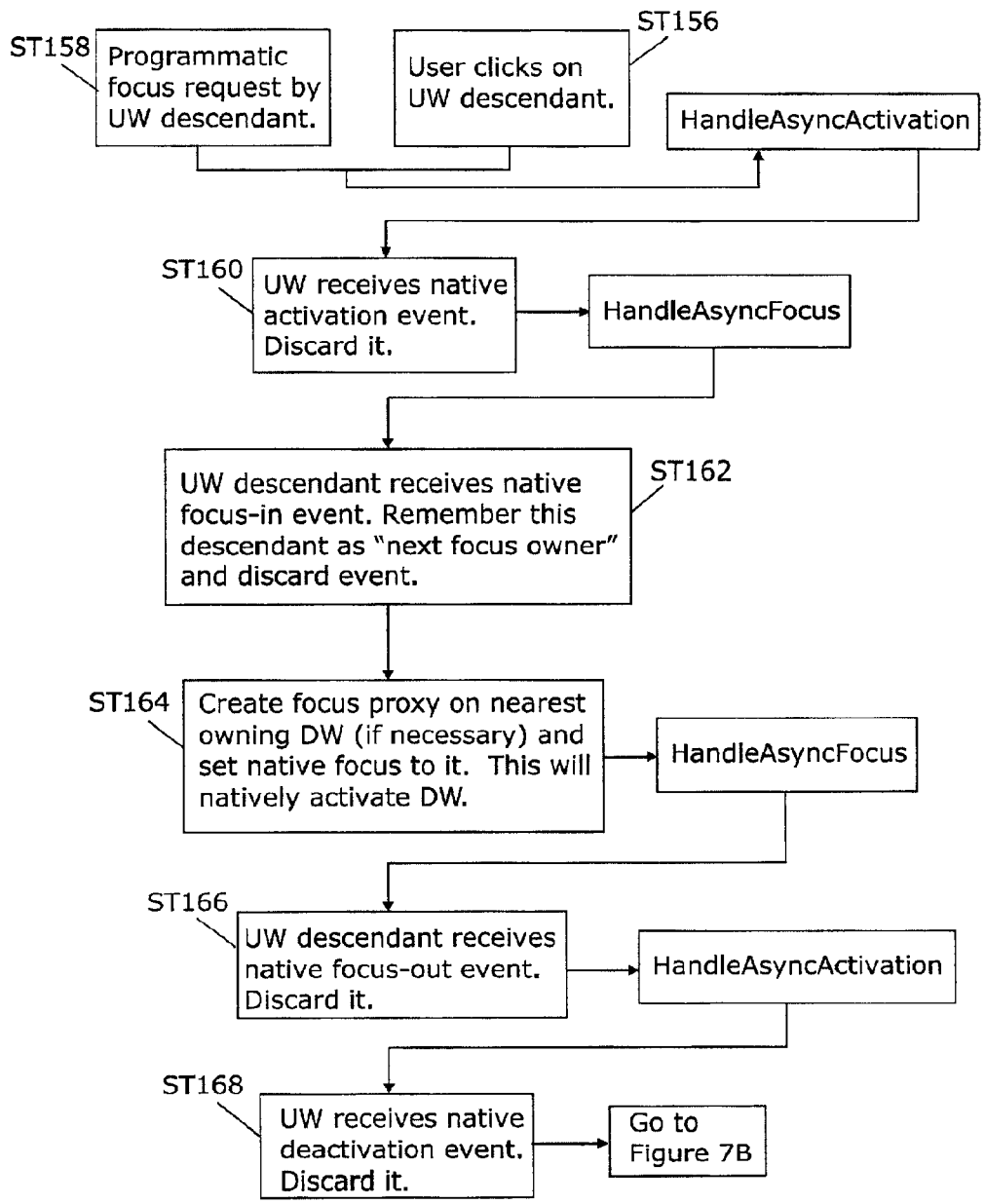
FIG. 7A is a flow chart illustrating a mechanism for transferring focus to a focusable descendant of an undecorated window according to one embodiment of the invention.
Figure 7B:
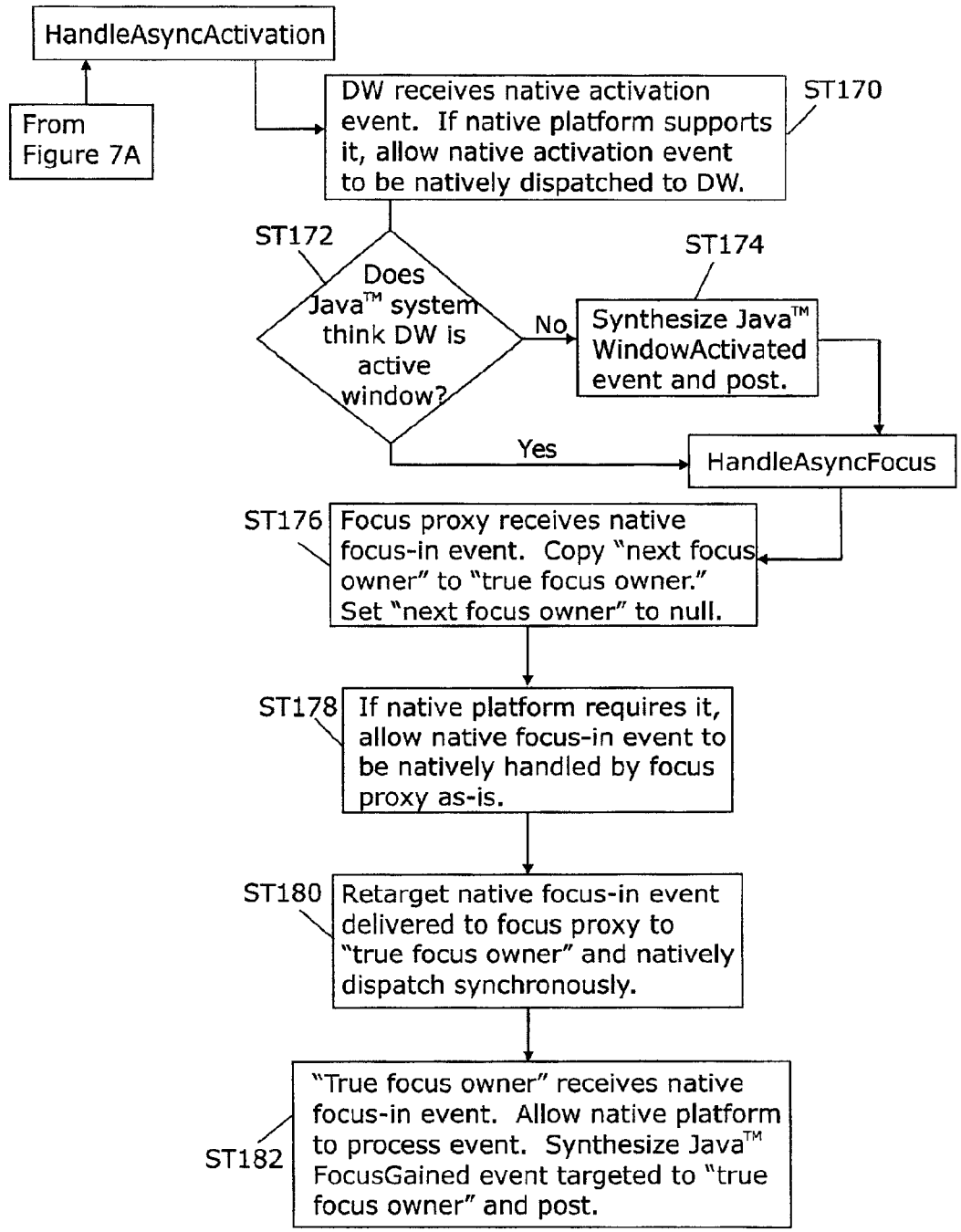
FIG. 7B is a continuation of FIG. 7A.

As a further result of the focus request on the focus proxy, the native platform will then generate an activation event for the DW that contains the focus proxy (and owns UW), and a focus-in event targeted at the focus proxy. Turning now to FIG. 7B, the next step involves executing the HandleAsyncActivation action (shown in FIG. 9) until the native activation event is received (ST170). This native activation event is allowed to be natively dispatched to DW. The next step involves checking if DW is the active window at the Java™-level (ST172). If DW is not the active window at the Java™-level, a Java™ WindowActivated event targeted to DW is synthesized and posted to the Java™ system (ST174). This will activate DW at the Java™-level. Once DW is active, the HandleAsyncFocus action (shown in FIG. 8) is executed.

At step ST176, the focus proxy receives the native focus-in event generated as a result of the focus request at step ST164. At this point, the "next focus owner" is copied into the "true focus owner," and the "next focus owner" is set to null. Recall that the "next focus owner" was previously set to the UW descendant at step ST162 (shown in FIG. 7A). This action now makes the UW descendant the "true focus owner."

At step ST178, the focus proxy can natively handle the native focus-in event. Then, the native focus-in event is retargeted to the "true focus owner" and dispatched synchronously (ST180). The "true focus owner" receives the native focus-in event (ST182). At this point, the platform is allowed to process the event normally. Then, a comparable Java™ FocusGained event targeted to the "true focus owner" is synthesized and posted to the Java™ system. Now, from the point of view of the Java™ system, the "true focus owner"—that is, the UW descendant—is the current focus owner. However, from the point of view of the native platform, the focus proxy is the current focus owner. Thus, focus has been transferred to the UW descendant without violating the native platform's definition of focus, which dictates that a descendant of an undecorated window cannot become the focus owner.

Figure 10:
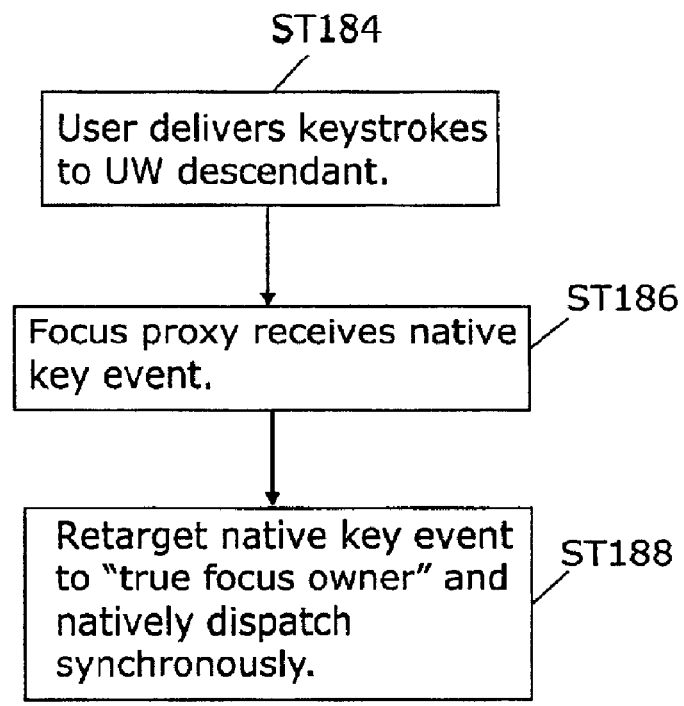
FIG. 10 is a flow chart illustrating a mechanism for handling keystrokes typed at a descendant of an undecorated window.

Now that the UW descendant has the focus at the Java™-level, keystrokes can be delivered to it. FIG. 10 shows what happens when the user types keystrokes at a UW descendant. At step ST184, the user makes a key input. When the user makes the key input, the native platform generates a native key event targeted to the focus proxy. The native key event is targeted to the focus proxy because the focus proxy is the current focus owner at the native level. The focus proxy receives the native key event (ST186). Then the native key event is retargeted to the "true focus owner" and dispatched to the "true focus owner" synchronously (ST188). The "true focus owner" then receives the native key event. The native platform is allowed to process the native key event. Subsequently, a comparable Java™ key event targeted to the "true focus owner" is synthesized.

Figure 11:
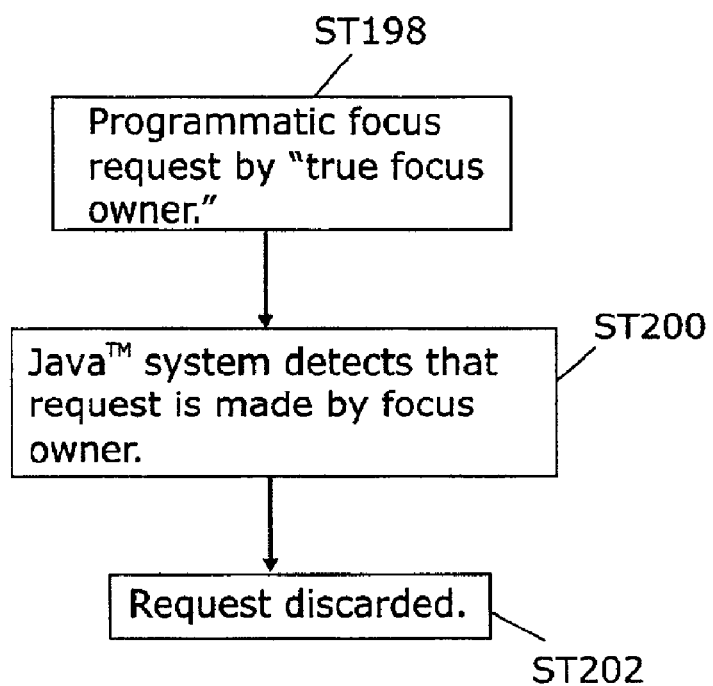
FIG. 11 is a flow chart illustrating a mechanism for handling a programmatic focus request issued by the true focus owner.

FIG. 11 shows what happens when the "true focus owner" issues a programmatic focus request. At step ST198, the "true focus owner" makes a programmatic focus request. The Java™ system detects that the focus request is made by the current focus owner (ST200) and discards the request (ST202). Because the "true focus owner" is already the Java™-level focus owner, no action is required.

FIGS. 12A–12E illustrate what happens when a focus transfer to another component is initiated while the focus proxy is the current native focus owner. This may happen when, for example, the user clicks on, or the application makes a programmatic focus request into, another component. It may also happen when the user clicks on the "true focus owner" because, if the "true focus owner" is a heavyweight component, the native platform may issue a focus request for the "true focus owner." (Recall that, from the point of view of the native platform, the focus proxy, not the "true focus owner", has focus.)

Figure 12A:
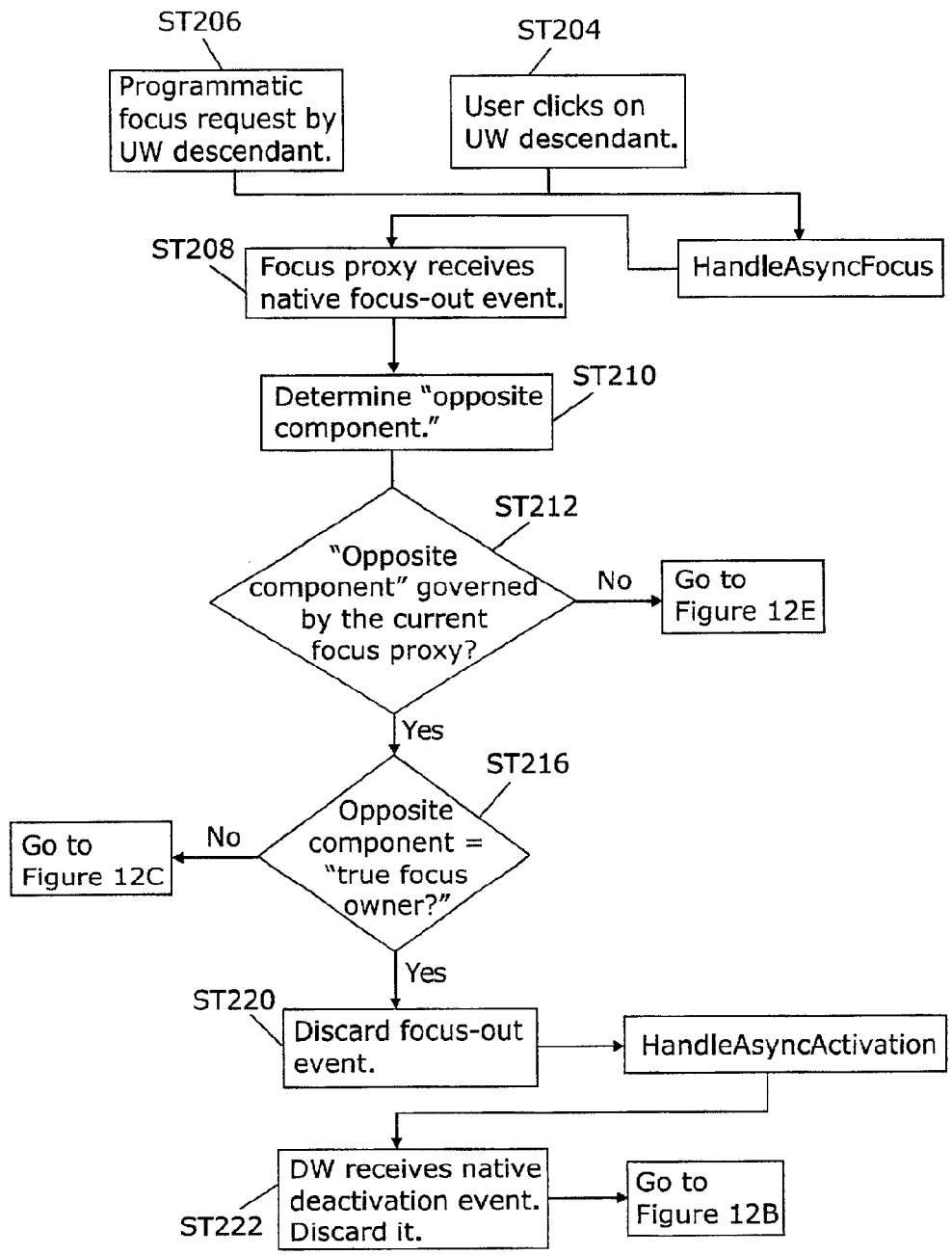
FIG. 12A is a flow chart illustrating a more generic mechanism for transferring focus to another component while the focus proxy is the current native focus owner.

Referring to FIG. 12A, initially, a user issues a focus request by clicking on a component (ST204) or a programmatic request is issued by the component (ST206). When the native platform receives the focus request, it generates a native focus-out event targeted at the focus proxy. Then the HandleAsyncFocus action (shown in FIG. 8) is executed until the focus proxy receives a native focus-out event (ST208). Next, at step ST210, the "opposite component" is determined. The "opposite component" is the component gaining focus at the native-level in conjunction with the focus-out event. The method then involves checking if the opposite component is governed by the current focus proxy (ST212).

Figure 12B:
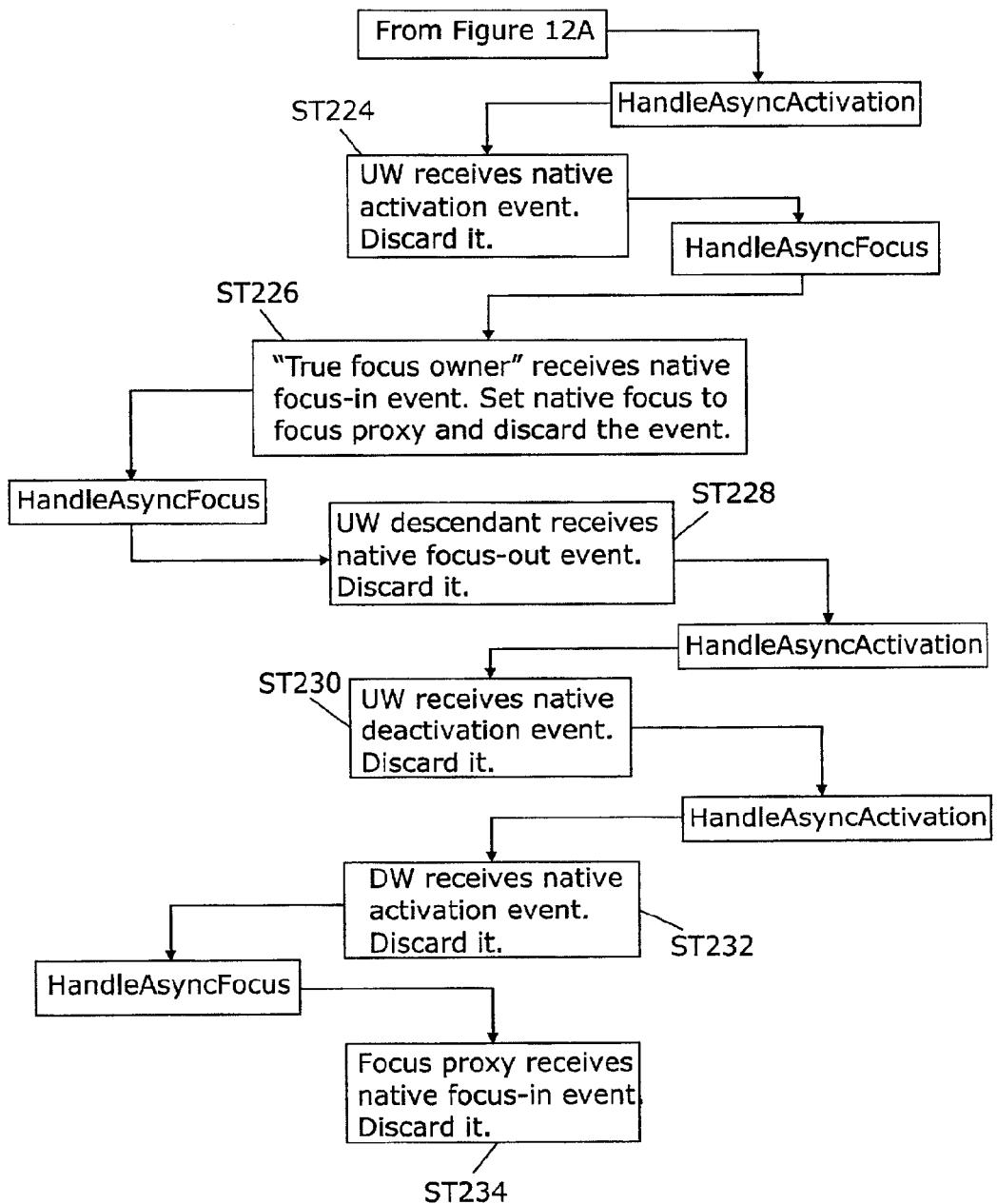
FIG. 12B is a continuation of FIG. 12A.
Figure 12C:
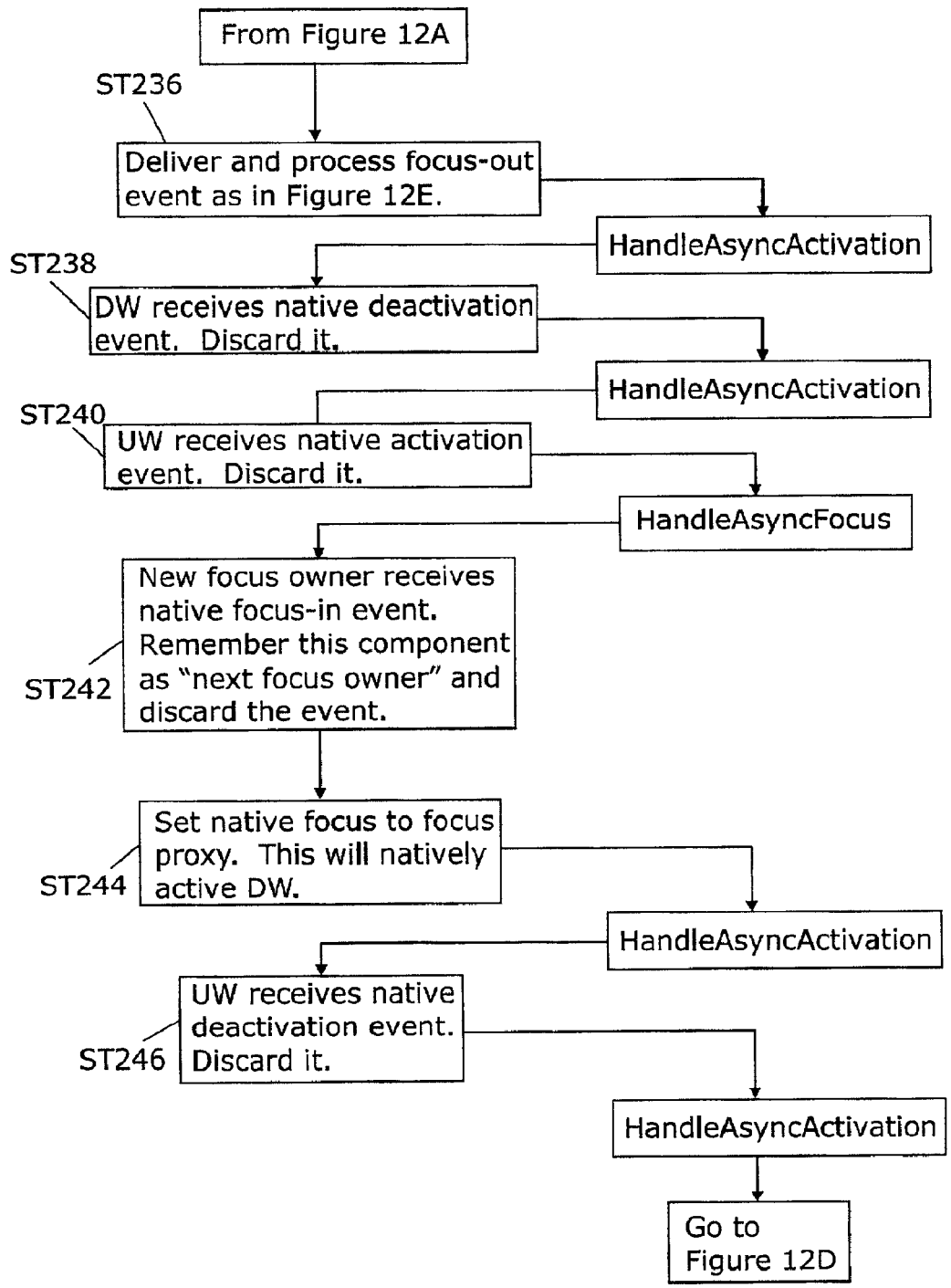
FIG. 12C is a continuation of FIG. 12A.
Figure 12D:
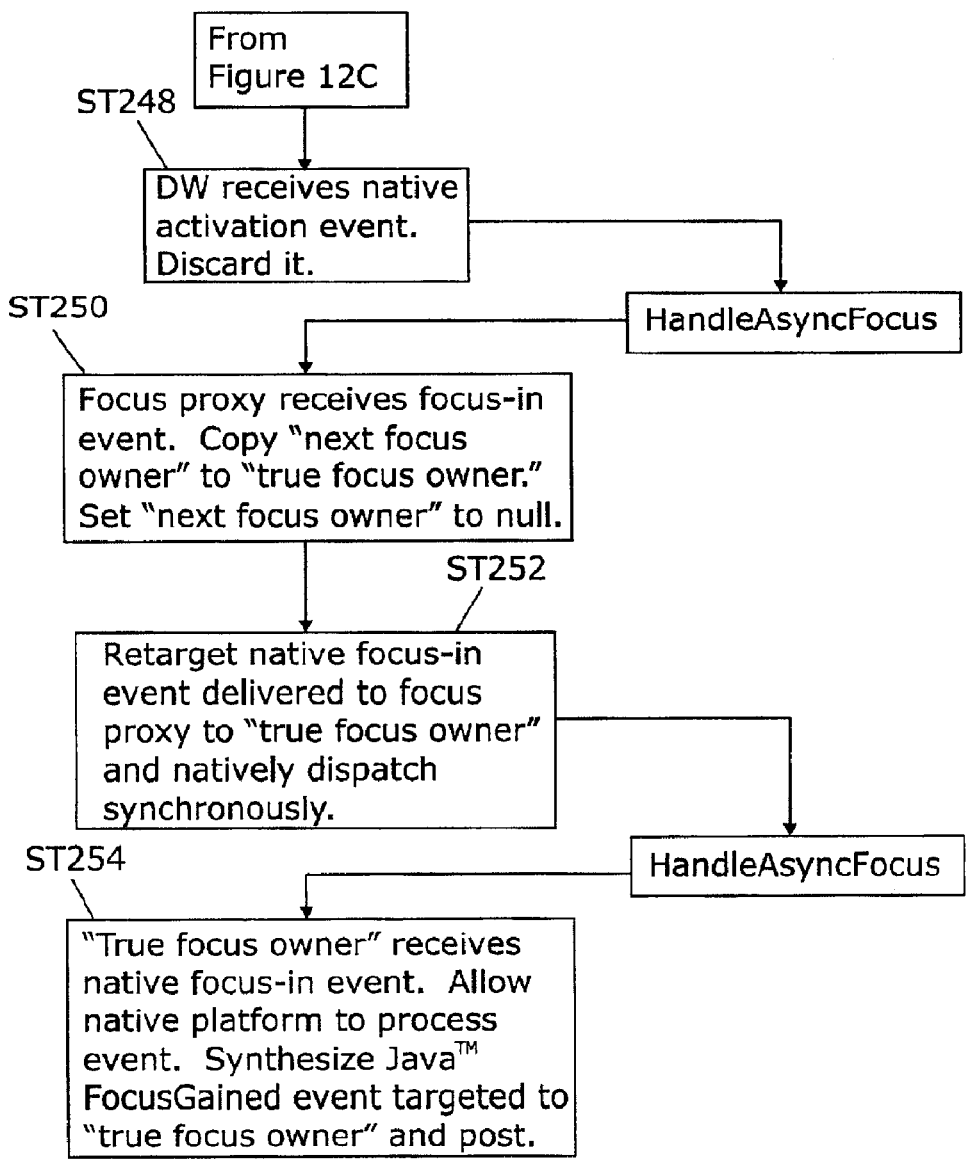
FIG. 12D is a continuation of FIG. 12C.
Figure 12E:
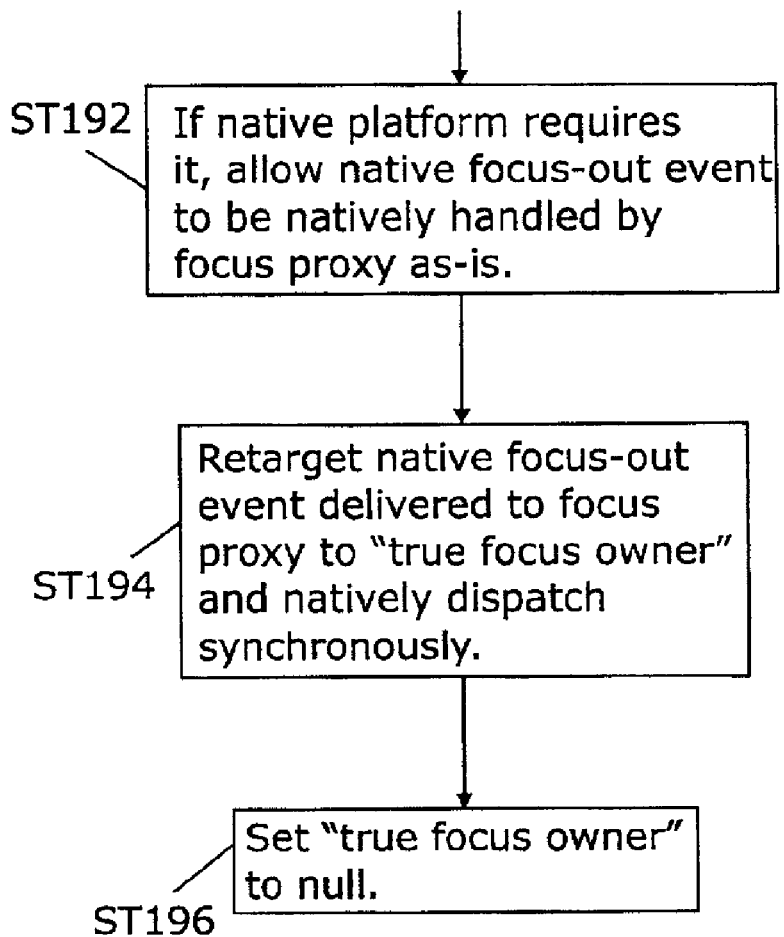
FIG. 12E is a continuation of FIG. 12A.

If the current focus proxy does not govern the opposite component, then normal focus transfer occurs, as illustrated by ST192 to ST196 in FIG. 12E. In FIG. 12E, if the native platform requires it, the focus proxy is first allowed to handle the native focus-out event (ST192). Then, the native focus-out event is retargeted to the "true focus owner" and natively dispatched synchronously (ST194). As a result, a corresponding Java™ focus event will be posted. The "true focus owner" is then set to null because focus has been moved out of the focus proxy (ST196).

Returning now to FIG. 12A, if the current focus proxy governs the opposite component, the next step involves determining if the opposite component is the "true focus owner" (ST216). If the opposite component is the "true focus owner," we want focus to remain in the focus proxy, and we want DW to remain the active window. Our strategy is to set focus back to the focus proxy and to discard all native focus and activation events having to do with these focus transfers so that, from the perspective of the Java™ platform, no focus transfer has occurred.

We start by discarding the native focus-out event (ST220). Then the HandleAsyncActivation action (shown in FIG. 9) is executed until DW receives a native deactivation event (ST222). This native deactivation event is discarded. Next, as illustrated in FIG. 12B, the HandleAsyncActivation action (shown in FIG. 9) is again executed. UW receives a native activation event, and that event is also discarded (ST224). Next, the HandleAsyncFocus action (shown in FIG. 8) is executed. The "true focus owner" receives a native focus-in event (ST226). As a result, at step ST228, native focus is set to the focus proxy. This will result in moving native focus out of the UW descendant into the focus proxy, and natively activating DW. The HandleAsyncFocus action (shown in FIG. 8) is then executed until the UW descendant receives the native focus-out event. The event is discarded, because we want the UW descendant to believe that it still owns native focus. Next, the HandleAsyncActivation action (shown in FIG. 9) is executed until. UW receives native deactivation event (ST230), which is also discarded. The HandleAsyncActivation action (shown in FIG. 9) is executed again until DW receives a native activation event (ST232). This native activation is discarded. The HandleAsyncFocus action (shown in FIG. 8) is executed. When the focus proxy receives a native focus-in event, the event is discarded (ST234). So, in essence, if the focus proxy receives a focus-out event and the opposite component is the "true focus owner," focus is not moved out of the focus proxy.

Returning to FIG. 12A, at step ST216, if the opposite component is governed by the current focus proxy, but is not the "true focus owner," the process outlined in FIG. 12C is followed. In that case, referring now to FIG. 12C, the native focus-out event is delivered to the focus proxy and processed (ST236) as in steps ST192 through ST196 of FIG.

12E. Returning to FIG. 12C, the HandleAsyncActivation action (shown in FIG. 9) is next executed until DW receives a native deactivation event, and the event is discarded (ST238). The HandleAsyncActivation action (shown in FIG. 9) is executed again until UW receives a native activation event, and the event is discarded (ST240). The HandleAsyncFocus action (shown in FIG. 8) is executed until the new focus owner receives a native focus-in event. This component is remembered as the "next focus owner," and the focus-in event is discarded (ST242). Next, the native focus is set to the focus proxy (ST244). This will natively activate DW.

The HandleAsyncActivation action (shown in FIG. 9) is executed until UW receives a native deactivation event, and the event is discarded (ST246). The HandleAsyncActivation action (shown in FIG. 9) is executed again until DW receives a native activation event, and the event is discarded (ST248 in FIG. 12D). Referring to FIG. 12D, the HandleAsyncFocus action (shown in FIG. 8) is executed until the focus proxy receives a native focus-in event (ST250). At this point, the "next focus owner" is copied into the "true focus owner," and the "next focus owner" is set to null. At step ST252, the focus-in event is retargeted to the "true focus owner" and natively dispatched synchronously (ST252). Next, the "true focus owner" receives the retargeted native focus-in event. The native platform is allowed to process the event. This includes posting a corresponding Java™ Focus-Gained event targeted to the "true focus owner" (ST254).

The description above handles the various scenarios that may be encountered as the user interacts with Java™ undecorated windows. As illustrated, the focus proxy is the primary mechanism by which keystrokes are delivered to descendants of such windows. This focus proxy needs to be a separate, invisible descendant of the owning decorated window and cannot simply be the decorated window itself or any of its visible descendants. The need for a separate, hidden focus proxy is illustrated by the following example. Suppose that the system was configured instead simply to "relay" key events to a descendant of an undecorated window via the active owning decorated window. Because the user thinks that a descendant of the undecorated window has native focus, if the user clicks in the owning active decorated window, the user will expect a change in focus to the decorated window (or one of its descendants) to occur. However, if the owning decorated window itself (or one of its descendants) is used as the relay point for keystrokes to the component of the undecorated window, then when the user clicks in that window (or that descendant), nothing will happen. This is because, so far as the native platform is concerned, that window (or descendant) already has focus. Thus, by creating the invisible focus proxy as a child of the owning, decorated window, clicking anywhere within the owning decorated window will cause a focus change to occur, namely from the focus proxy child to the parent window or the appropriate, visible descendant. As a result, the implementation is completely transparent to the user.

In accordance with the above, the invention provides a method and system by which keystrokes can be delivered to descendants of Java™ undecorated windows without violating the platform's definition of focus. Moreover, the use of a focus proxy in accordance with the embodiments of the invention allows the Java™ platform to transfer native key events to the "true focus owner" in a manner such that the native platform believes focus remains within the active window, yet sends proper native focus events to the "true focus owner." Furthermore, the existence of the focus proxy and the relay of the key events from the focus proxy to the "true focus owner" are completely transparent to the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for delivering keystrokes to descendants of an undecorated inactive window within a Java™ environment, comprising: remembering a descendant of said undecorated inactive window as a next focus owner when the descendant receives a focus-in event; creating a focus proxy for said undecorated inactive window and issuing a request to set focus to the focus proxy; marking the next focus owner as the true focus owner when the focus proxy receives a focus-in event; directing the focus-in event received by the focus proxy to the true focus owner; and discarding a native focus-out event received by the descendant wherein the-native focus-out event is generated in response to the request to set focus to the focus proxy.

2. The method if claim 1, wherein the focus-in event received by the descendant is a native focus event generated in response to a request to set focus to the descendant.

3. The method of claim 2, wherein remembering the descendant of said undecorated inactive window as the next focus owner comprises discarding the focus-in event received by the descendant.

4. The method of claim 2, further comprising discarding a native activation event received by said undecorated inactive window, wherein the native activation event is generated in response to the request to set focus to the descendant.

5. The method of claim 1, wherein creating a focus proxy for said undecorated inactive window comprises creating an invisible child of a nearest owning window of said undecorated inactive window that can be active.

6. The method of claim 5, further comprising activating the nearest owning window of said undecorated inactive window that can be active.

7. The method of claim 1, wherein the focus-in event received by the focus proxy is a native focus event generated in response to issuing the request to set focus to the focus proxy.

8. The method of claim 1, wherein the descendant of said undecorated inactive window receives the focus-in event in response to a user clicking on the descendant.

9. The method of claim 1, wherein the descendant of said undecorated inactive window receives the focus-in event in response to the descendant issuing a focus request through function invocation.

10. The method of claim 1, wherein the focus proxy receives a key event when a keystroke is delivered to the descendant.

11. The method of claim 10, further comprising directing the key event to the true focus owner.

12. A method for delivering keystrokes to descendants of an undecorated inactive window within a Java™ environment, comprising: remembering a descendant of said undecorated inactive window as a next focus owner when the descendant receives a focus-in event; creating a focus proxy for said undecorated inactive window and issuing a request to set focus to the focus proxy; marking the next focus owner as the true focus owner when the focus proxy receives a focus-in event; directing the focus-in event received by the focus proxy to the true focus owner; and determining a component gaining focus when the focus proxy receives a focus-out event.

13. The method of claim 12, further comprising determining whether the component is governed by the focus proxy.

14. The method of claim 13, further comprising determining whether the component is the true owner if the component is governed by the focus proxy.

15. The method of claim 14, further comprising discarding the focus-out event if the component is not the true owner.

16. The method of claim 15, further comprising issuing a request to set focus to the focus proxy.

17. The method of claim 14, further comprising directing the focus-out event to the true focus owner and setting the true focus owner to null if the component is not governed by the focus proxy.

18. The method of claim 17, further comprising remembering the component as the next focus owner when the component receives a focus-in event.

19. The method of claim 18, further comprising issuing a focus request to the focus proxy.

20. The method of claim 19, further comprising marking the next focus owner as the true focus owner when the focus proxy receives a focus-in event.

21. The method of claim 20, further comprising directing the focus-in event delivered to the focus proxy to the true focus owner.

22. A method for delivering keystrokes to descendants of an undecorated inactive window within a Java™ environment, comprising: remembering a descendant of said undecorated inactive window as a next focus owner when the descendant receives a focus-in event; creating a focus proxy for said undecorated inactive window and issuing a request to set focus to the focus proxy; marking the next focus owner as the true focus owner when the focus proxy receives a focus-in event; directing the focus-in event received by the focus proxy to the true focus owner; directing the key event received by the focus proxy to the true focus owner; and discarding a native focus-out event received by the descendant wherein the-native focus-out event is generated in response to the request to set focus to the focus proxy.

23. The method of claim 22, wherein the key event is generated in response to a user delivering keystrokes to the descendant.

24. A method for delivering keystrokes to descendants of an undecorated inactive window within a Java™ environment, comprising: creating a focus proxy for said undecorated inactive window and directing a key event received by the focus proxy to a descendant of said undecorated inactive window; and discarding a native focus-out event received by the descendant, wherein the native focus-out event is generated in response to the request to set focus to the focus proxy.

25. The method of claim 24, wherein the focus proxy is created when the descendant receives a focus-in event.

26. The method of claim 25, the descendant receives a focus-in event in response to a user clicking on descendant.

27. The method of claim 25, wherein the descendant receives a focus-in event in response to the descendant issuing a focus request through function invocation.

28. The method of claim 24, wherein the focus proxy receives the key event when a keystroke is delivered to the descendant.

29. The method of claim 28, wherein creating the focus proxy comprises determining the nearest owning window of said undecorated inactive that can be active and creating an invisible child of the nearest owning window of said undecorated inactive window that can be active as the focus proxy.

30. A computer-readable medium having stored thereon a program which is executable by a processor, the program comprising instructions for: creating a focus proxy for an undecorated inactive window within a Java™ environment and directing a key event received by the focus proxy to a selected descendant of said undecorated inactive window; and discarding a native focus-out event received by the descendant, wherein the native focus-out event is generated in response to the request to set focus to the focus proxy.

31. The computer-readable medium of claim 30, wherein the program creates the focus proxy in response to the descendant receiving a focus-in event.

32. The computer-readable medium of claim 31, wherein the descendant receives the focus-in event in response to a user clicking on the descendant.

33. The computer-readable medium of claim 31, wherein the descendant receives the focus-in event in response to the descendant issuing a focus request through function invocation.

34. The computer-readable medium of claim 30, wherein the program further comprises instructions for remembering the descendant as the next focus owner when the descendant receives the focus-in event.

35. The computer-readable medium of claim 34, wherein the program further comprises instructions for marking the next focus owner as the true focus owner when the focus proxy receives a focus-in event.

36. The computer-readable medium of claim 35, wherein the program further comprises instructions for directing the focus-in event received by the focus proxy to the true focus owner.

37. The computer-redable medium of claim 30, wherein instructions for creating a focus proxy for said undecorated inactive window comprise instructions for determining the nearest owning window of said undecorated inactive window at can be active and creating an invisible child of the nearest owning window that can be active as the focus proxy.

* * * * *